United States Patent [19]
Thompson

[11] Patent Number: 5,466,154
[45] Date of Patent: Nov. 14, 1995

[54] BRAILLE BOARD WITH MOVABLE DOT PINS

[76] Inventor: James M. Thompson, 12961 S. Indian River Dr., Jensen Beach, Fla. 34957-2225

[21] Appl. No.: 95,545
[22] Filed: Jul. 26, 1993
[51] Int. Cl.⁶ .................................... G09B 21/00
[52] U.S. Cl. ............................................ 434/114
[58] Field of Search ............................. 434/114, 113, 434/112

[56] References Cited

U.S. PATENT DOCUMENTS

| | | |
|---|---|---|
| 3,293,502 | 2/1965 | Bierele . |
| 3,594,787 | 7/1971 | Ickes ..................................... 434/114 X |
| 3,987,438 | 10/1976 | Lindenmueller et al. ........... 434/114 X |
| 4,191,945 | 3/1980 | Hannen et al. . |
| 4,194,190 | 3/1980 | Bareau . |
| 4,266,936 | 5/1981 | Rose et al. .............................. 434/114 |
| 4,687,444 | 8/1987 | Garner . |
| 4,871,992 | 10/1989 | Petersen . |
| 4,959,567 | 9/1990 | Ealey et al. . |
| 5,065,434 | 11/1991 | Matsuoka et al. . |
| 5,108,290 | 4/1992 | Eriksson . |
| 5,195,894 | 3/1993 | le Blanc et al. . |

OTHER PUBLICATIONS

*Braille Books and Pamphlets*, National Library Service for the Blind and Physically Handicapped, The Library of Congress, Specification #800, Aug. 1991, pp. 1–14.

Primary Examiner—Gene Mancene
Assistant Examiner—Jeffrey A. Smith
Attorney, Agent, or Firm—Richard C. Litman

[57] ABSTRACT

A braille board having dot pins placed in a raised or lowered state via actuators connected thereto is provided with a cordwood circuit board to which the actuators are attached. The braille board provides a full page of braille to the user having twenty-five lines of forty characters per line. Since each braille cell in the United States has six dot pin locations per cell, it is necessary to access six thousand different actuators. A plurality of solid state switching chips is provided to selectively actuate each of the actuators under the control of a microprocessor and chip controller. The microprocessor translates alphanumeric information into at least one page of braille, each page of braille having up to twenty-five lines.

6 Claims, 7 Drawing Sheets

BRAILLE BOARD WITH MOVABLE DOT PINS

BACKGROUND OF THE INVENTION

1. Field of the Invention

The present invention relates to an electromechanical braille board display having solenoids or electromechanical transducers for moving the dot pins of the display. More particularly, the present invention pertains to those electromechanical braille board displays which provide a full page of braille information as defined by the National Library Service for the Blind and Physically Handicapped.

2. Description of the Prior Art

Electromechanical braille board displays using solenoids to place the dot pins of each cell of the board in either an upward or a downward position are disclosed in the prior art. A cell in the United States is two columns across and three rows down for a total of six dot locations for a cell, while the European braille cell has eight dot locations per cell. Each solenoid is associated with one of the dot pin, requiring six (6) solenoids for each cell using the U.S. braille cell configuration. Due to the number of solenoids required, various schemes have been implemented for tactile displays in order to reduce the number of solenoids required or the use an alternative to solenoids.

U.S. Pat. No. 5,195,894 issued Mar. 23, 1993 to Pieter W. C. J. le Blanc discloses a braille mouse having three cells to scan text on a computer screen. The dot pins are selectively raised from their normally lowered position by either a disc, belt, or drum having different character codes thereon. Once the proper code is accessed, a single solenoid is used to raise the pins.

U.S. Pat. No. 5,108,290 issued Apr. 28, 1992 to Bror A. Eriksson discloses a device for displaying braille characters by placing balls between two driven belts at different locations along the lengths of the belts as they are rotating.

U.S. Pat. No. 4,871,992 issued Oct. 3, 1989 to Robert C. Petersen discloses a tactile display utilizing an electromagnet to move a disk-shaped cam for positioning the dot pins of each cell in their raised or lowered states. A translator is used to convert the ASCII codes from a computer to a code for displaying the braille information by the tactile display board.

U.S. Pat. No. 4,194,190 issued Mar. 18, 1980 to Alain Bareau discloses a tactile display device utilizing solenoids to place the dot pins in either their raised or lowered states. Bareau also discloses a converter to translate alphanumeric information to a braille format.

U.S. Pat. No. 4,191,945 issued Mar. 18, 1980 to Martin R. Hannen et al disclose a braille board display in which each cell of the braille board may be individually accessed by a selector switch.

U.S. Pat. No. 5,065,434 issued Nov. 12, 1991 to Mikiharu Matsuoka et al discloses a controller including a microprocessor to control the flow of data to and from the storage memory. More specifically, RAM is used as a work space to store the scanned information provided by a camera once that information is converted into digital data and ROM is used to store the operating program.

U.S. Pat. No. 4,687,444 issued Aug. 18, 1987 to H. Douglas Garner discloses a tactile display using RAM to load a text information and to retrieve only a portion of that text information as needed.

U.S. Pat. No. 4,959,567 issued Sep. 25, 1990 to Mark A. Ealey et al discloses a solenoid using a permanent magnet.

U.S. Pat. No. 3,293,502 issued Dec. 20, 1966 to John D. Beierle discloses a cordwood circuit board design.

*Braille Books and Pamphlets*, National Library Service for the Blind and Physically Handicapped from the Library of Congress, Specification #800, August 1991, pages 1–14.

None of the above inventions and patents, taken either singly or in combination, is seen to describe the instant invention as claimed.

SUMMARY OF THE INVENTION

The braille board designs in the prior art generally use few cells in their displays since each cell has six solenoids to selectively activate each dot pin to a raised or lowered state. The number of lead connections would become cumbersome to handle in the prior art since each solenoid is individually accessed. For example, Petersen discloses a modular tactile display unit representing one braille cell and having prong leads extending therefrom to allow each solenoid controlling the dot pins therein to have power selectively provided thereto. The modular design of Petersen allows for the placement of a plurality of cells in a single braille board device. However, the dual in-line package design of the individual cell tactile displays would make for a cumbersome, if not impossible, circuit board design to place these tactile displays on one circuit board if a complete page of braille were to be represented. More specifically, a full page of braille having forty (40) cells across and twenty-five (25) lines down would require forty (40) columns and twenty-five (25) rows of the tactile displays. This would require a circuit board with twelve thousand (40×25 cells and 12 leads per cell) traces.

The tactile displays of the prior art as represented by Petersen have few tactile cells in comparison to the full page of braille as set forth by the Library of Congress. A blind person using a tactile display with few characters would not be able to "read" a large volume of material quickly since the display would have to be refreshed often. A comparison for sighted individuals would be having to read a novel having no more than a few lines of print per page. The device of the present invention uses cordwood circuit board design for handling the logistics of having a full page of braille displayed at one time on a braille board display. With the cordwood circuit board design, fewer traces are needed for each circuit board than would be needed if only one circuit board were used.

In order to reduce the amount of electricity required to activate the six-thousand solenoids, each solenoid has a permanent magnet actuating rod so that flux of the solenoid winding will be in opposition to the actuating rod to push up a dot pin when activated. This provides a quick refreshing of the braille board as one page is "erased" and another page is "written" to the braille board. Further, less flux need be provided by the individual solenoid coils in order to provide a given amount of upwards push or downwards pull. Another embodiment uses electromechanical transducers, each including a permanently magnetized dot pin located above an electromagnet to provide a repulsive flux to push the dot pin up.

Accordingly, it is a principal object of the invention to provide a braille board display having a full page of braille displayed each time a new page is written to the display.

It is another object of the invention to provide a cordwood circuit board design which will allow a full page of braille to be displayed using modular tactile units representing a cell of braille information.

It is a further object of the invention to provide a solenoid having a permanently magnetized actuating rod or an electromechanical transducer having a permanently magnetized dot pin to reduce the amount of current required to push the dot pin upwards with a sufficient force so as to be read.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
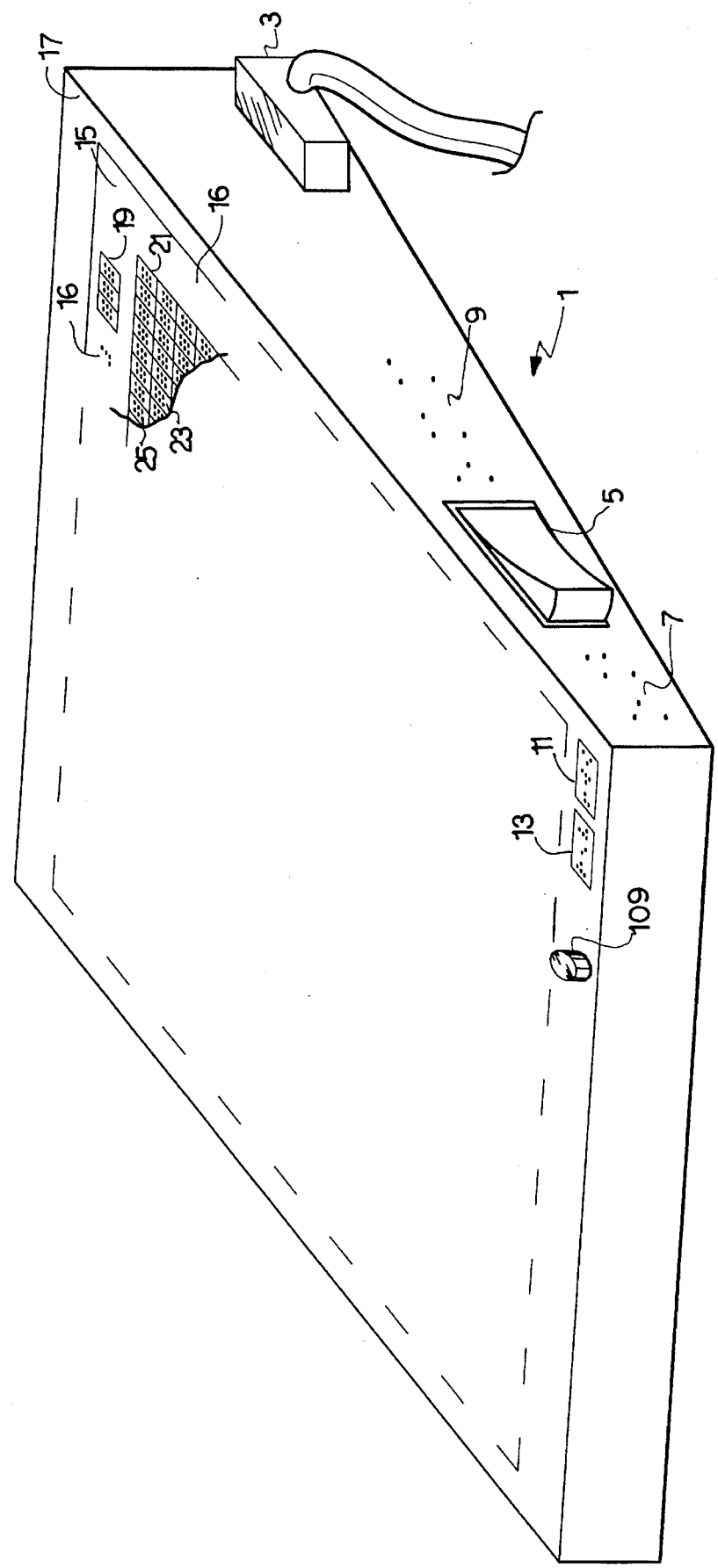
FIG. 1 is a top perspective view of the present invention with a portion thereof removed.

As shown in FIG. 1, the braille board 1 of the present invention has a computer hook-up 3 identical to the standard serial or parallel port connections used for printers. The computer hookup 3 allows the computer (not shown) connected to the other end of the hook-up 3 to provide alphanumeric data to the braille board 1. A conventional On/Off switch 5 is provided at the side of the braille board with braille letters 7 representing the word "On" and braille letters 9 representing the word "Off". The On/Off switch 5 would control the power from the power source (not shown) in the conventional manner. A page forward button 11 is pushed by the user to refresh the braille board with the next page of data to be displayed, while a page back button 13 is pushed by the user to refresh the braille board with the previous page of data displayed. The page forward button 11 has the braille representation "FWD" located thereon and the page back button 13 has the braille representation of "REV" located thereon. The braille board 1 has a reading surface 15 having an outer boarder 17 located therearound being constructed of the same material as the rest of the wall of the board 1. The reading surface 15 is preferably constructed of a material offering a minimum abrasion of the user's finger as the user "reads" the text of braille. The page back button 13 and the page forward button 11 are located within the outer boarder 17.

The reading surface 15 also has an inner boarder 16 in which no text is found so as to allow space for the user's fingers to extend beyond the end of a line of braille text and to be located in front of a line of braille text while still being located on the reading surface 15. The inner boarder 16 also extends above and below the braille text and the outer boarder 17 extends all the way around the inner boarder 16. As shown in FIG. 1, in a right hand portion located above the braille text and inside the inner boarder 16, a page number indicator display 19 is provided for allowing the user to determine the page number of the page presently displayed by the braille board 1. The page number display has the braille representation of the number symbol "#" in front of three braille board cell locations representing the page number in braille.

Figure 2:
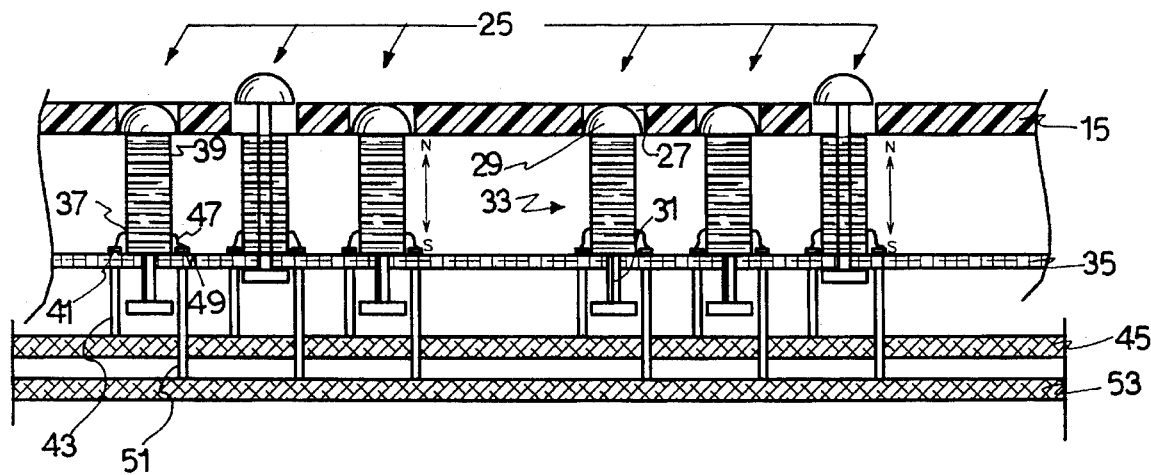
FIG. 2 is a partial view of the solenoid attached to the circuit board of the first embodiment of the present invention.

As partially shown in FIG. 1, a first row of cell locations 21 has 40 cell locations located thereacross. In the first embodiment of the present invention, each braille cell location 23 has six (6) dot pin locations 25 located thereon having an aperture 27 located thereat going through the braille board reading surface 15 as shown in FIG. 2. As shown in FIG. 2, each dot pin 29 is connected to the top of an actuating rod 31 of a solenoid 33. Each solenoid 33 is soldered to a first circuit board 35. A first lead 37 of each solenoid winding 39 of each solenoid 33 is connected to a first solder connection 41 having an electrical connection to a first prong lead 43 attached to the first circuit board 35 and leading down to a second circuit board 45 to form an electrical connection therewith. Each solenoid winding 39 also has a second lead 47 connected to a second solder connection 49 having an electrical connection to a second prong lead 51 attached to the first circuit board 35 and leading down to a third circuit board 53 forming an electrical connection therewith. The second prong leads 51 pass through the second circuit board 45 without making any connection therewith.

The second circuit board 45 would preferably contain the traces connecting each first lead 37 of each solenoid winding 39 for each solenoid 33 of the braille board 1 to ground. The third circuit board 53 would preferably contain traces individually connecting each second lead 47 of the solenoids 33 to separate solid state switches for selectively providing power to each of the solenoids 33 under the control of a microprocessor as discussed below.

Figure 3:
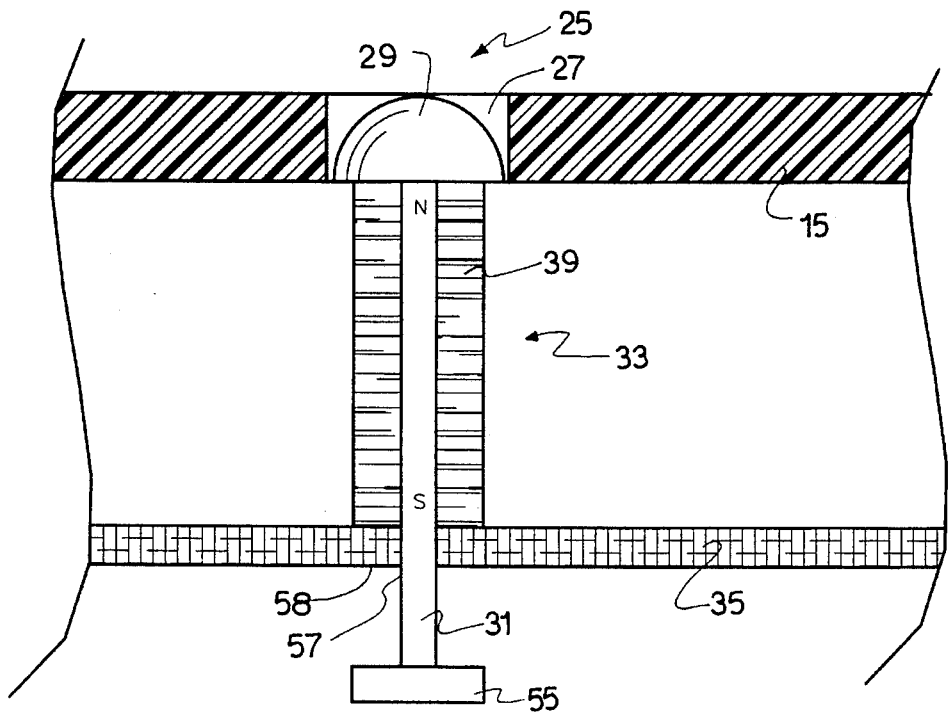
FIG. 3 is a partial cross-sectional view of one solenoid of the first embodiment of the present invention.

As shown in FIG. 3, each solenoid winding 39 of each solenoid 33 has a predetermined thickness and length for allowing a large number of turns therein, thereby increasing the amount of flux generated thereby per unit current passing therethrough. Further, each actuating rod 31 is permanently magnetized in order to provide an opposing flux as power is provide from the first lead 37 thereof to the second lead 47 thereof connected to ground. In this manner, the amount of magnetic force per unit current is increased with an increase in the strength of the permanently magnetized solenoid actuating rod 31.

As shown in FIG. 3, a flanged stop 55 is located at a bottom end of the permanently magnetized actuating rod 31 and passes through a hole 57 located through the first circuit board 35. FIG. 3 shows dot pin 29 in its lowered position. With the dot pin 29 in its raised state a predetermined distance above the braille board reading surface 15, the flanged stop 55 abuts a bottom portion 58 of the first circuit board 35. With the dot pin 29 in its lowered state, the dot pin 29 abuts a top portion of the solenoid winding 39.

Figure 4:
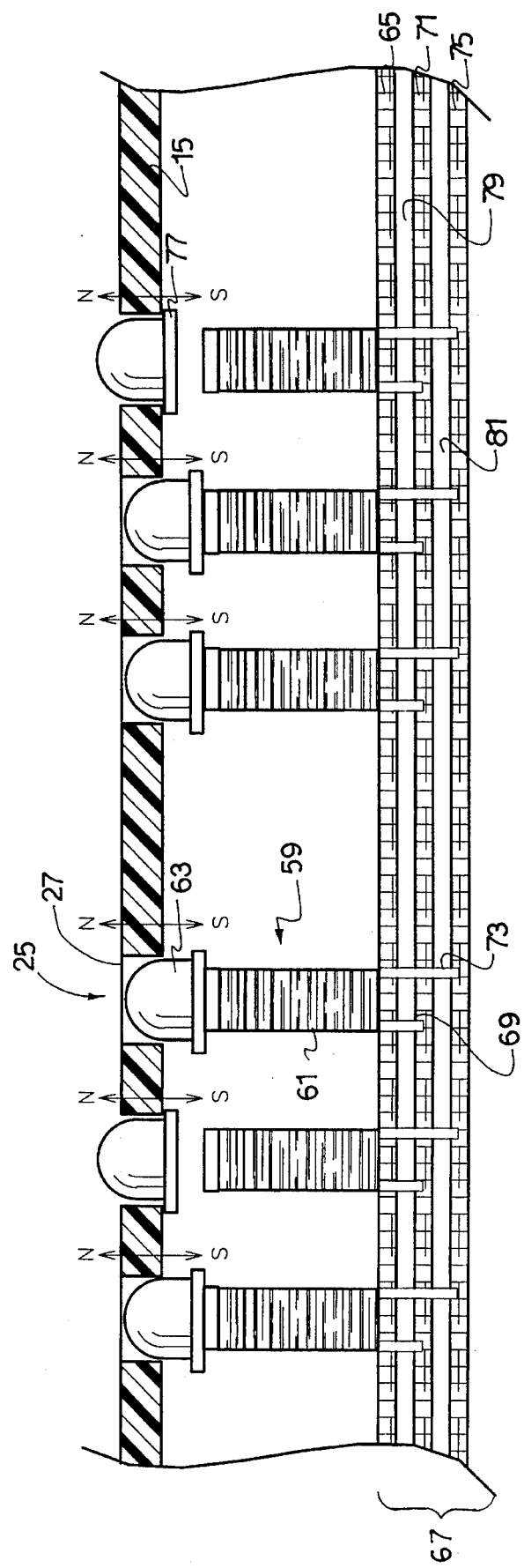
FIG. 4 is a partial view of the electromechanical transducers attached to the circuit board of the second embodiment of the present invention.

A second embodiment of the present invention is illustrated in FIG. 4. In the second embodiment, electromechanical transducers are used as the actuating members to provide raised or lowered dot pins. More specifically, each electromechanical transducer 59 includes an electromagnet 61 having a permanently magnetized dot pin 63 located above it, and each dot pin 63 is located within an aperture 27 of the braille board reading surface 15. Each electromagnet 61 is rigidly secured to a first circuit board 65 of a cordwood circuit board 67, with the electromagnet 61 thereof having a first lead prong 69 leading to a second circuit board 71 to form an electrical connection therewith and a second lead prong 73 leading to a third circuit board 75 to form an electrical connection therewith. Each dot pin 63 includes a bottom flanged stop 77 to abut a bottom portion of the braille board reading surface 15 when located in a raised state and a top portion of the electromagnet 61 when located in a lowered state. When activated, the electromagnets 61 produces an opposite magnetic polarity to that of the permanently magnetized dot pin 63. For example, as shown in FIG. 4, the permanently magnetized dot pins 63 have a north polarity at the top thereof. When an electromagnet 61 is energized, a south polarity is provided at the top thereof to repel the permanently magnetized dot pin 63 located thereover; otherwise, the dot pin rests atop the electromagnet 61.

The cordwood circuit board 67 has insulating layer 79 located between the first circuit board 65 and the second circuit board 71, as well as insulating layer 81 located between the second circuit board 71 and the third circuit board 75. Cordwood circuit board design having insulating layers between successive circuit boards is known in the art, as illustrated by Beierle, made of record.

Figure 5:
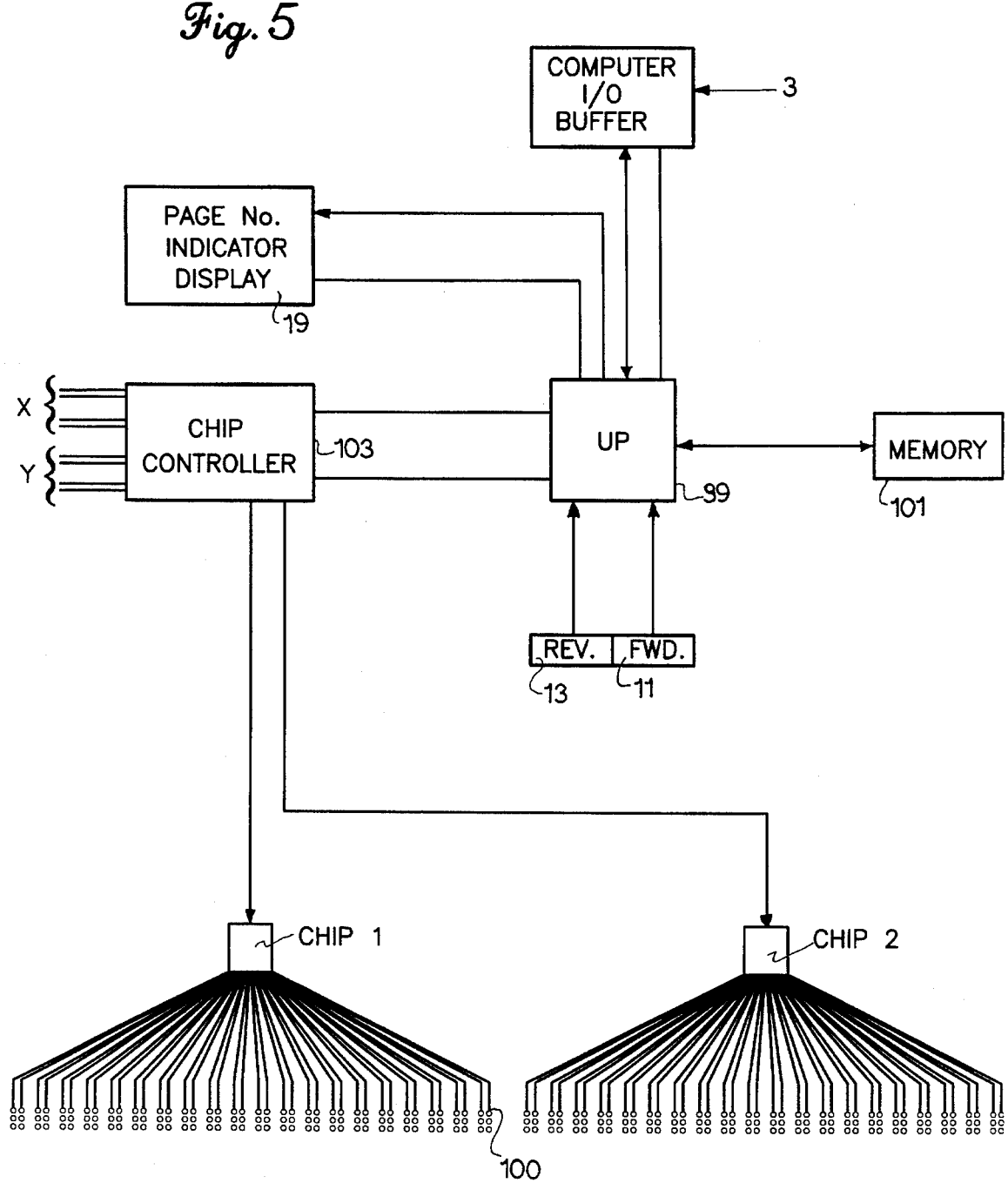
FIG. 5 is a block diagram of the control circuitry of the present invention driving each solenoid of each cell therein.

The microprocessor 99, as shown in FIG. 5, controls the operation of the braille board 1 for either the first embodiment using solenoids or the second embodiment using electromechanical transducers as the actuators 100 for placing the dot pins in their raised or lowered states. Memory 101 includes the ROM on which the programming instructions are stored to operate the microprocessor 99, and also the RAM which allows the microprocessor to store pages of text in alphanumeric data and translate it into braille character data to control the braille board 1. Petersen discloses a translator for accomplishing this purpose. An algorithm necessary to control the various circuit connectors by the microprocessor 99 in order to provide the braille text to the user on the braille board 1 is easily rendered by the above disclosure.

The microprocessor 99 controls the various actuators 100 through the use chip controller 103. Chip controller 103 in turn controls a plurality of solid state switches within a chip. For example, a chip 1 controls the top most actuators 100 of the first set of twenty braille cell locations 23 of the first row of braille cell locations 21. A chip 2 controls the top most actuators 100 of the second set of braille cell locations 23 of the first row of braille cell locations 21. The next set of twenty actuators 100 directly below those controlled by chip 1 would be controlled by a chip 3 (not show). The set of twenty actuators below those controlled by chip 2 would be controlled by chip 4 (not shown). The system contains 150 chip circuits of solid state switches for providing power to the individual actuators through the second leads or lead prongs thereof connected to the third circuit boards as stated above. The chip controller 103 contains other leads 0 for controlling the odd chips 3, 5, 7, through 149. The leads E are connected to the even chips 4, 6, 8, through 150.

Figure 7:
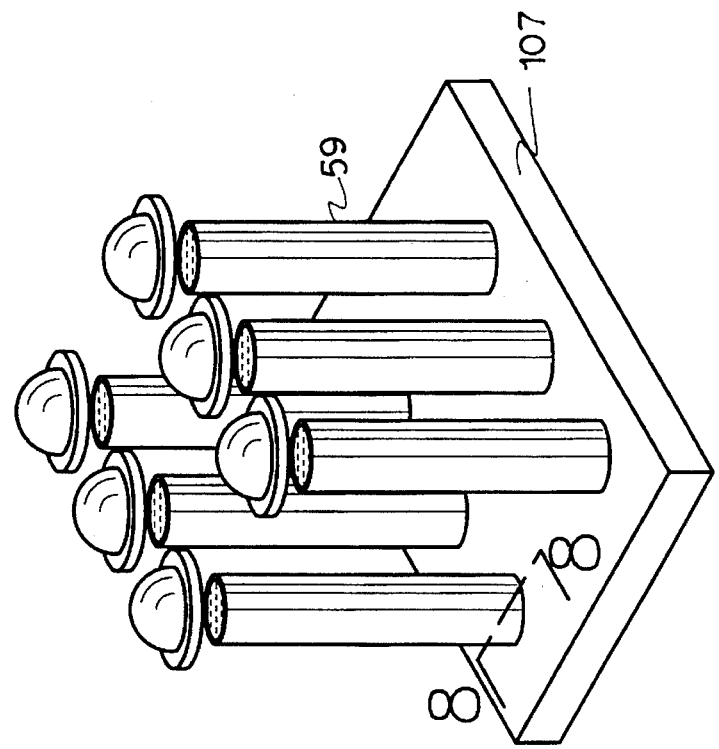
FIG. 7 discloses a fourth embodiment in which electromechanical transducers appear in cell modular connectable to a circuit board.
Figure 6:
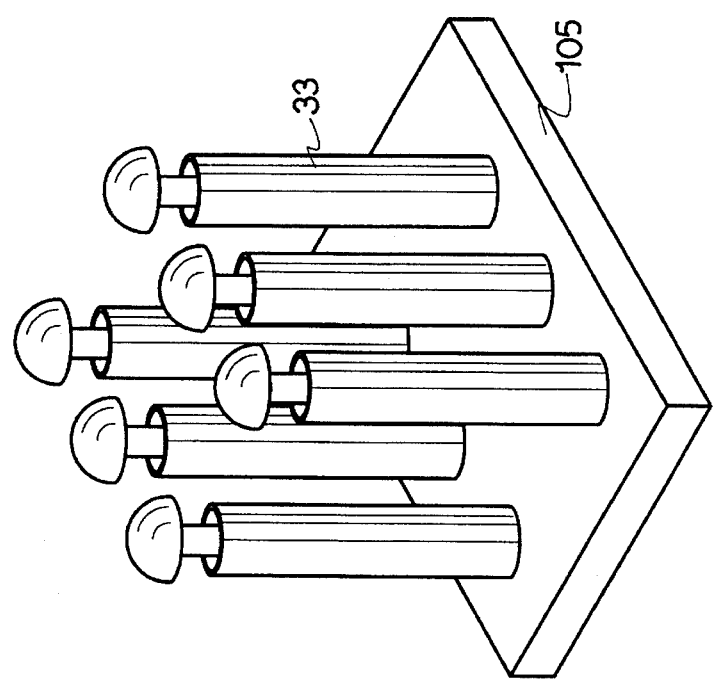
FIG. 6 discloses a third embodiment in which solenoid appear in cell modular units attachable to a circuit board.

Each braille cell (e.g., location 23) may be a modular unit 105 as illustrated in FIG. 6 for the use of solenoids 33 as the actuators 100 as used in the first embodiment, or a modular unit 107 as illustrated in FIG. 7 for the use of electromechanical transducers as the actuators 100 as used in the second embodiment. Alternatively, the modular design may be a whole row of cells, i.e., 25 cells on one chip. For all of the modular unit designs discussed above, each modular unit would be connectable to a cordwood circuit board. Any number of cordwood circuit boards could be used in order to reduce the number of traces required on each circuit board.

Figure 8:
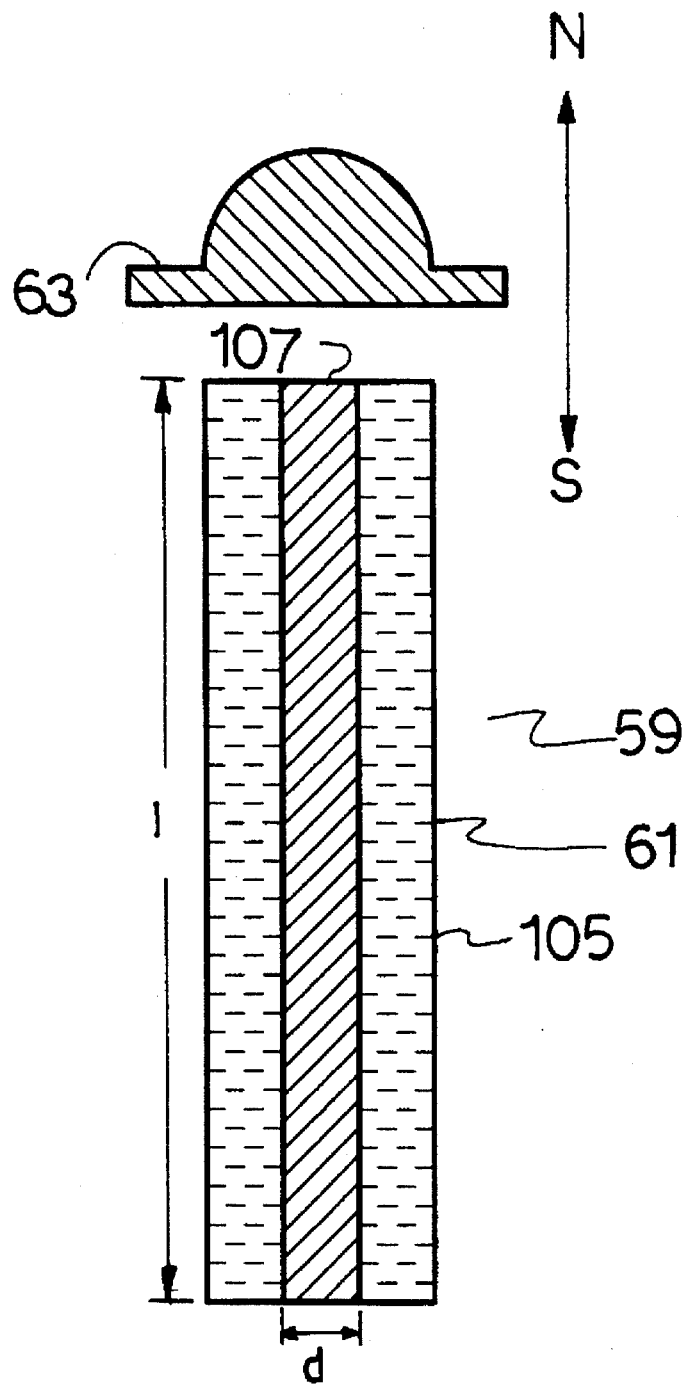
FIG. 8 is a cross-sectional view of an electromechanical transducer used in the present invention.
Figure 9:
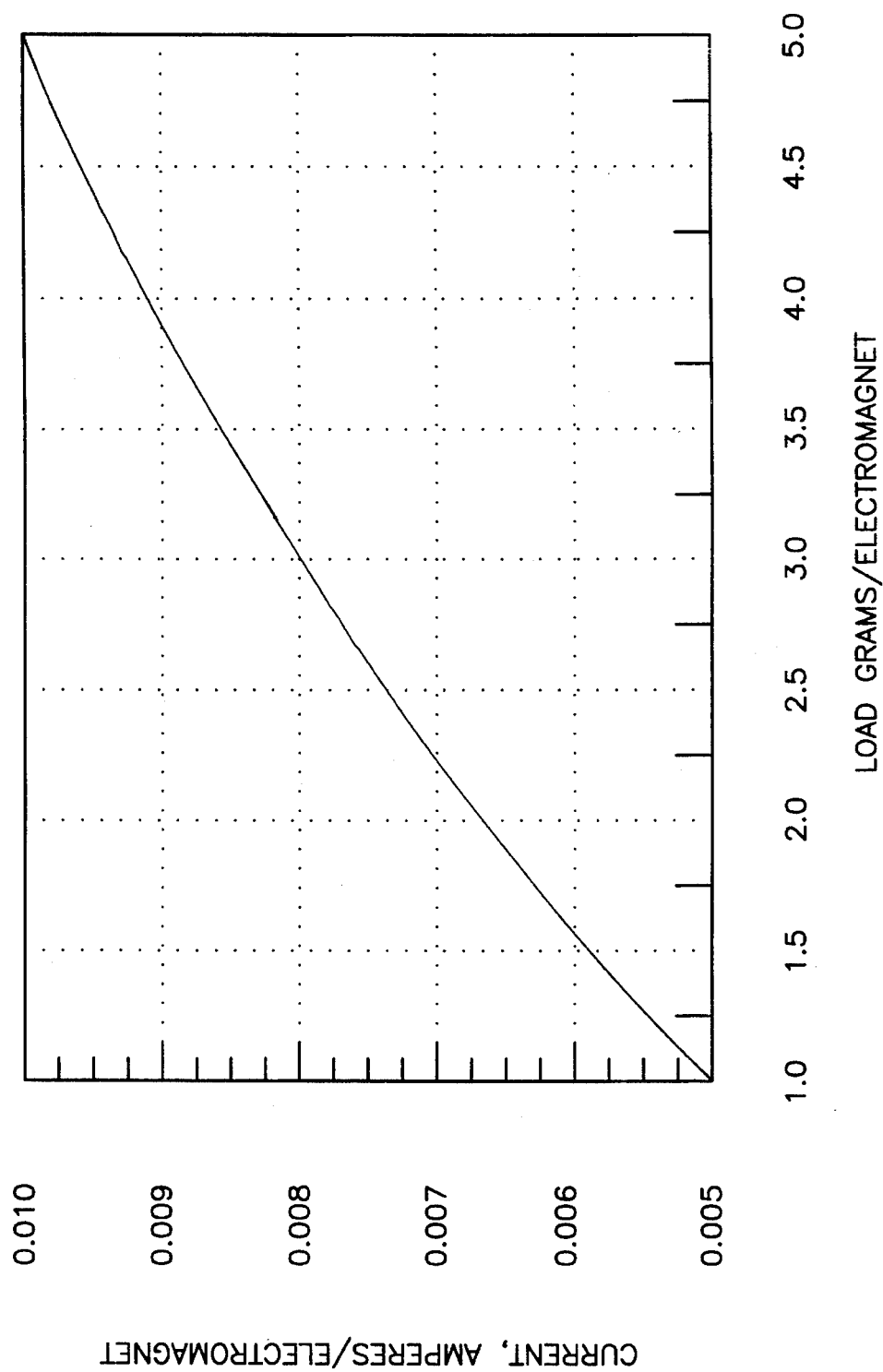
FIG. 9 is a graph illustrating the electromagnetic force a solenoid could exert for a given amount of current passing therethrough.

FIG. 8 illustrates a cross-sectional view of an electromechanical transducer 59 as illustrated in FIG. 7. As stated above, by using a sufficient number of coil turns and by using permanently magnetized dot pins 63. As shown in FIG. 8, the electromagnet 61 contains an electromagnet coil 105 wrapped around a cast steel core 107. For a core diameter d of 0.057" and length 1 of 0.25", where the coil wire has a diameter of 0.003" and the factor of the number of turns times the coil length, NL, is equal to 0.569, a graph as shown in FIG. 9, indicating the amount of force in grams given a predetermined amount of current passing though the electromagnet coil, can be mathematically derived from the governing formulas relating the electromagnetic force exerted by an electromagnet having the characteristics set forth above.

As shown in FIG. 1, a control knob 109 may be provided on the braille board 1 so as to allow a user to vary the amount of upward force exerted on the dot pin. For example, if the control knob 109 were turned so as to allow 10 milliamps to pass through each activated electromagnetic coil 105, an upward force of 5.0 grams would be applied on the dot pin thereof. The control knob 109 allows the user to adjust the upward force exerted on the dot pins so as to adjust the proper upward force on the pins as the user would prefer when "reading" the braille text. With regard to the first embodiment, by varying the amount of current passing through a solenoid 33, the upward force exerted on the dot pin may be varied in much the same way as in the second embodiment, i.e., by increasing the current passing through a coil, the upward force exerted on the dot pin is also increased. In the preferred embodiment, the control knob 109 could be used to adjust a potentiometer between the chip controller and power supply.

It is to be understood that the present invention is not limited to the embodiments described above, but encompasses any and all embodiments within the scope of the following claims.

I claim:

1. A braille board display device comprising:

data input means for accessing alpha-numeric information from an outside source;

data conversion means for translating said alpha-numeric information into at least one page of braille text, each of said at least one page of braille text containing one-thousand braille cell locations configured into forty columns of cells across and twenty-five lines of cells down, each of said cells having a plurality of dot pin locations to represent one alpha-numeric character, said data conversion means utilizing the maximum number of cells per line in accordance with the last word which will fit on that line; and means for displaying said at least one page of braille text;

said means for displaying includes a braille board reading surface portion having a plurality of apertures therethrough, each of said plurality of apertures being located through said braille board reading surface portion at each of said dot pin locations for each of said one thousand braille cells, a plurality of dot pins, each one thereof being located within each of said plurality of apertures, said plurality of dot pins having a lowered state residing below said braille board reading surface portion and a raised state wherein a portion thereof resides a predetermined distance above said braille board reading surface portion, a plurality of actuators, each one thereof being connected to each one of said plurality of dot pins for selectively placing each one thereof into said raised and lowered states;

each of said plurality of actuators includes a solenoid having a solenoid winding located about a permanently magnetized actuating rod, one of said plurality of dot pins being located at a top end thereof, and a flanged stop being located at a bottom end thereof, each of said solenoids of each of said plurality of actuators being soldered to a top portion of a first circuit board such that a first lead of each of said solenoid windings have a connection to a first set of solder connections of said first circuit board and a second lead of each of said solenoid windings have a connection to a second set of solder connections of said first circuit board, said first circuit board further having a plurality of holes therethrough for allowing a bottom portion of each of said permanently magnetized actuating rods to pass through one of said plurality of holes such that each of said flanged stops connected to the bottom ends of each of said permanently magnetized actuating rods abut a portion of a bottom portion of said first circuit board located about each of said holes when the dot pin connected to the top end of each of said permanently magnetized actuating rods is in said raised state, each of said dot pins abutting a top portion of one of said solenoid windings when located in said lowered state;

each of said first solder connections having a first prong lead in electrical communication therewith, each of said first prong leads extending down from said first circuit board a first predetermined distance to form an electrical communication between said first circuit board and a second circuit board, each of said second solder connections having a second prong lead in electrical communication therewith, each of said second prong leads extending down a second predetermined distance through said second circuit board to form an electrical communication between said first circuit board and a third circuit board.

2. A braille board display according to claim 1, further comprising:

a plurality of solid state switching chips, each one containing a plurality of solid state switches for selectively providing power to a portion of said solenoids;

a buffer storage means for receiving alphanumeric information from an outside source;

a controller for receiving said outside alphanumeric information from said outside source so as to control said plurality of solid state switching chips in such a manner as to translate at least a portion of said alphanumeric characters into a page of braille text having up to twenty five lines.

3. A braille board display as claimed in claim 1, including means for allowing a user of said display device to vary the amount of current passing through each of said solenoid windings of each solenoid.

4. A braille board display device comprising:

data input means for accessing alpha-numeric information from an outside source;

data conversion means for translating said alpha-numeric information into at least one page of braille text, each of said at least one page of braille text containing one-thousand braille cell locations configured into forty columns of cells across and twenty-five lines of cells down, each of said cells having a plurality of dot pin locations to represent one alpha-numeric character, said data conversion means utilizing the maximum number of cells per line in accordance with the last word which will fit on that line; and means for displaying said at beast one page of braille text;

said means for displaying including a braille board reading surface portion having a plurality of apertures therethrough, each of said plurality of apertures being located through said braille board reading surface portion at each of said dot pin locations for each of said one thousand braille cells, a plurality of dot pins, each one thereof being located within each of said plurality of apertures, said plurality of dot pins having a lowered state residing below said braille board reading surface portion and a raised state wherein a portion thereof resides a predetermined distance above said braille board reading surface portion, a plurality of actuators, each one thereof being connected to each one of said plurality of dot pins for selectively placing each one thereof into said raised and lowered states;

each of said plurality of actuators includes an electromagnetic transducer having an electromagnet connected to a cordwood circuit board, each of said dot pins being made of permanent magnetizable material and being located directly above each of said electromagnets, each of said dot pins containing a bottom flanged portion such that each of said bottom flanged portions abut a bottom portion around each of said plurality of apertures of said braille board reading surface portion when each of said dot pins are in a raised state, said bottom flanged portions of each of said dot pins abutting a top portion of each of said electromagnets when in a lowered state;

said each of said electromagnets being rigidly secured to a first circuit board of said cordwood circuit board, said electromagnets including first prong leads extending to a second circuit board of said cordwood circuit board being located directly below said first circuit board, said electromagnets including second prong leads extending to a third circuit board of said cordwood circuit board being located directly below said second circuit board, said cordwood circuit board including electrical insulation layers between said first and second circuit boards and between said second and third circuit boards.

5. A braille board display according to claim 4, further comprising:

a plurality of solid state switching chips, each one containing a plurality of solid state switches for selectively providing power to a portion of said electromagnetic transducers;

a buffer storage means for receiving alphanumeric information from an outside source;

a controller for receiving said outside alphanumeric information from said outside source so as to control said plurality of solid state switching chips in such a manner as to translate at least a portion of said alphanumeric characters into a page of braille text having up to twenty five lines.

6. A braille board display as claimed in claim 4, including means for allowing a user of said display device to vary the amount of current passing through each of said solenoid windings of each electromagnetic transducer.

* * * * *